Oct. 20, 1931.   K. E. PEILER   1,828,720
APPARATUS FOR FEEDING MOLTEN GLASS
Filed March 20, 1922   2 Sheets-Sheet 1
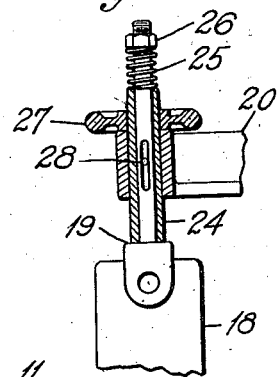
Fig.6.
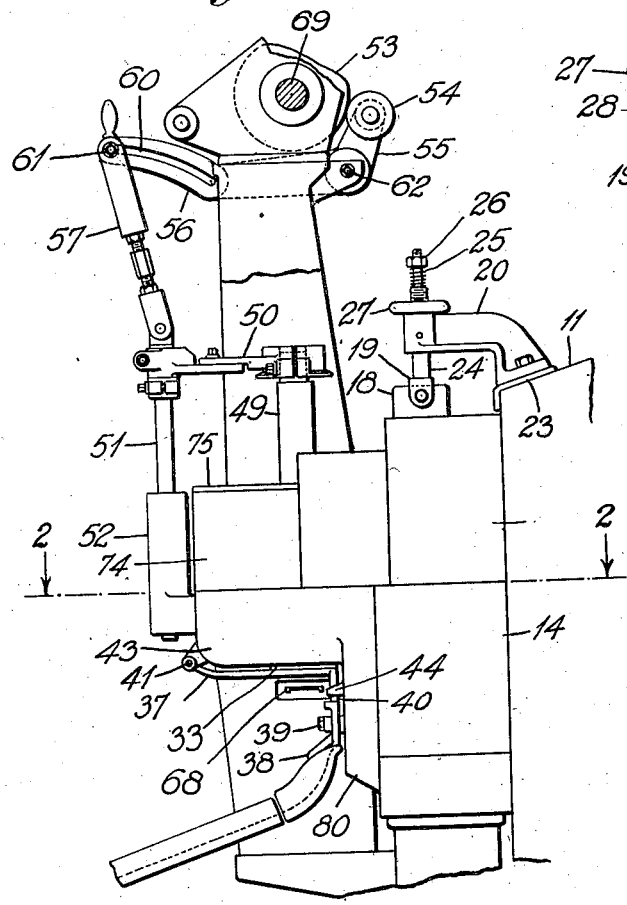
Fig.1.
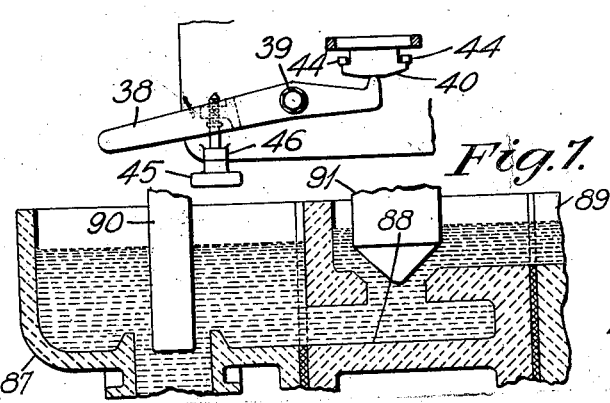
Fig.4.
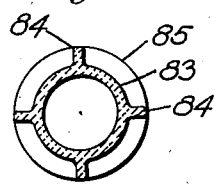
Fig.5.
Fig.7.
Inventor:
Karl E. Peiler
by W. H. Honiss
Atty.

Oct. 20, 1931.  K. E. PEILER  1,828,720

APPARATUS FOR FEEDING MOLTEN GLASS

Filed March 20, 1922  2 Sheets-Sheet 2

Inventor:
Karl E. Peiler
by Wm H Honiss
Atty.

Patented Oct. 20, 1931

1,828,720

UNITED STATES PATENT OFFICE

KARL E. PEILER, OF WEST HARTFORD, CONNECTICUT, ASSIGNOR, BY MESNE ASSIGNMENTS, TO HARTFORD-EMPIRE COMPANY, OF HARTFORD, CONNECTICUT, A CORPORATION OF DELAWARE

APPARATUS FOR FEEDING MOLTEN GLASS

Application filed March 20, 1922. Serial No. 545,082.

This invention relates to apparatus for feeding mold charges of molten glass and more particularly to apparatus for forming the mold charges in compact suspended masses of controllable shape, and delivering them either directly to the molds of a glass shaping machine or to some form of conveying device by which they are delivered to the mold.

An object of the invention is to provide an apparatus of the character described, a further object is to provide an apparatus which will produce homogeneous mold charges of uniform size and shape in rapid succession and in the proper thermic condition, and which will be capable of a wide range of adjustment to produce mold charges of any desired size or shape, suited for the making of different sizes and shapes of glassware. It is also an object of the invention to provide improved independent means for controlling respectively the size and the shape of the mold charges. A further object is to improve certain details of construction which will be described.

The various features of the invention employed for the accomplishment of these objects, and such others as will hereinafter appear, will best be understood from the following description and accompanying drawings of one embodiment of the invention, in which:—

Figure 1 is a side elevation of the apparatus;

Fig. 4 is a partial front elevation, looking from the left in Fig. 3, showing the means for securing the outlet ring in place;

Fig. 5 is a plan view in section on the line 5 of Fig. 3;

Fig. 6 is a side elevation in central section through the gate adjusting device; and Fig. 7 is a side elevation, in section, showing a modified arrangement of the passages whereby the glass flows downward through the inlet port.

The supply of molten glass 10 (Fig. 3) may be flowed from or through any suitable means, such for example, as a forehearth 11 projecting from a glass melting tank of any usual type. The glass flows from the forehearth to a pool 12 in a basin from which it is discharged to form the mold charges. The quantity discharged for each charge is regulated by adjusting the level of the glass in the pool.

For the purpose of this regulation, the supply of glass from the furnace or other source of supply is made to enter the basin entirely below the lowest working level of the glass in the basin, so that the glass preferably flows into the pool in a vertical direction, either downwardly or upwardly, and preferably the latter, for convenience of construction and of regulation by a valve device. As shown herein, the glass enters the basin through its bottom wall, so that the pool of glass extends over the inlet, all portions of which are thus completely and equally submerged at all times.

Figure 2:
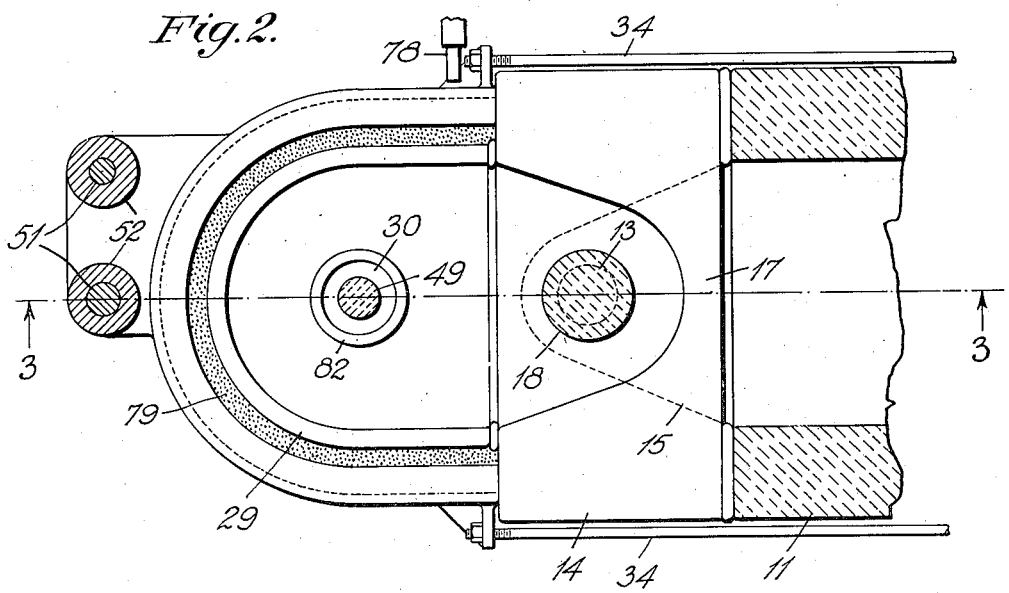
Fig. 2 is a plan view, in larger scale, and in section, taken on the line 2—2 of Fig. 1.
Figure 3:
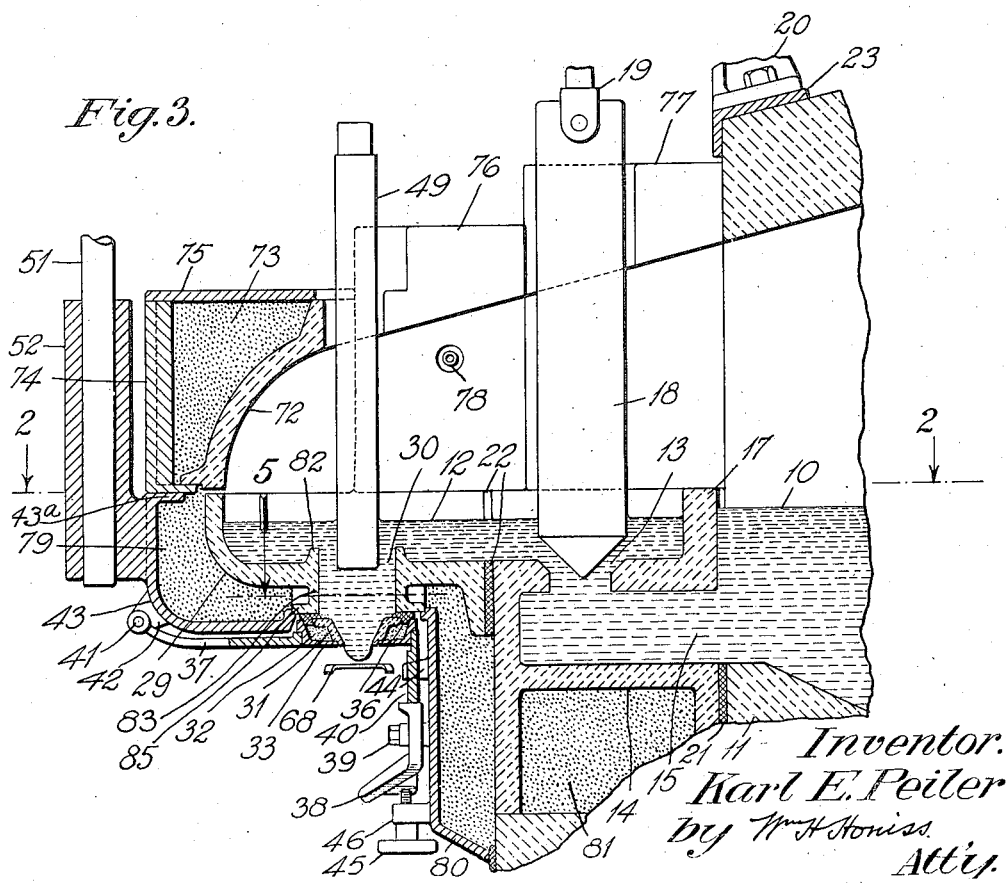
Fig. 3 is a side elevation, in section on the center line 3—3 of Fig. 2.

A further feature of this arrangement, also conducive to uniformity of flow, and to the control of the flow equally over all portions of the inlet area, is the disposal of the inlet port substantially in a horizontal plane parallel with the horizontal stratification of the glass in the pool. Ordinarily the glass is heated from above, and therefore varies in temperature and viscosity according to its depth, being usually hotter and less viscous at the surface, and progressively cooler, and therefore more viscous, toward the bottom. Therefore, the entire area of the inlet port coincides with a stratum of the glass, the viscosity and flow resistance of which is uniform over the entire area of the inlet port. A convenient construction and arrangement is shown in the drawings, in which the regulating passage is formed in a gate block 14, and enters the basin vertically through the inlet 13, the flow capacity of which is controlled by the adjustable valve 18. As shown in Figs. 2 and 3, the supply passage 15 in the gate block 14 connects with the glass supply in the forehearth or furnace 11. This block 14 also forms a part of the discharge basin, its vertical wall 17 extending above the level of the glass and forming a continuation of the enclosing vertical wall of the spout block 29.

The entirely submerged location of the valve opening enables the inflow of glass through the regulating passage to be influenced by changes in the level of the glass in the pool, in addition to and cooperating with the control exercised by the inlet valve 18. However the valve may be set, the rate of inflow through the submerged inlet also depends upon the varying differences in level of the glass in the pool and the glass in the forehearth. With any given flow area of the inlet opening, as regulated by the valve, the hydrostatic resistance to inflow through the inlet is increased by the rising of the level in the pool, the flow ceasing altogether when the level of the glass in the pool reaches the level of the glass in the forehearth. Conversely, the lowering of the glass level in the pool lessens the hydrostatic resistance to inflow, thus increasing the rate of inflow. These constantly exerted influences tend to produce stable equilibrium of the levels, and makes the proper adjustment of the inflow by the valve much easier to obtain than would be the case if the inlet opening were above the surface level of the glass in the pool. In the latter case, opening the valve too far would rapidly flood the pool, and closing it too far would rapidly drain the pool, since in that case the changes of hydrostatic head in the pool, due to changes in level would not react upon the inflow through the inlet opening. Moreover, the disposal of the inlet port in a horizontal plane, coincident with a plane of uniform viscosity of the glass, renders the regulation of inflow easier and more certain than if the inflow port were disposed in a vertical plane extending across strata of different flow resistances.

This arrangement of the inflow port permits the use of a vertically movable valve which may be suspended in the glass and may maintain its position relative to the inflow orifice by its own weight, without the use of the guides, which are necessary in cases where the glass flows in a horizontal direction in order to guide and sustain the regulating valve or gate against the sidewise pressure of the glass which pressure causes resistance to the movements of the gate. Such guides are objectionable, especially when they are also immersed in the glass, since they become encrusted with the glass which sometimes hardens sufficiently to "freeze" them in position, and in all cases interferes with the free movement of the valve or gate.

The valve 18 is suspended between the forked ends of a rod 19 (Figs. 1 and 6) yieldingly supported by a bracket 20, removably secured to a plate 23. The valve has a yielding connection with its operating means to prevent breaking the valve or the adjacent portions of the walls of the flow inlet, inasmuch as the valve is also employed for closing the inlet to shut off the supply of glass to the pool when the operation of the apparatus is to be discontinued. When thus used, difficulty may be encountered in opening the valve to start the flow again, due to the valve having become "frozen" more or less firmly to the wall or edge of the orifice by the chilled glass. On account of the low tensile strength of burned refractory clay from which such valves are made, they are liable to be pulled apart in an attempt to open them too forcibly. A spring connection is, therefore, provided between the valve and its actuator, which yields if the glass is too viscous to permit free movement of the valve, and applies force only sufficient to move the valve gradually from its position as the glass yields to the pressure of the spring.

The operating connection between the bracket 20 and the rod 19 comprises a sleeve 24 loosely mounted in the bracket and on the rod 19, and a spring 25 compressed between the top of the sleeve and a nut 26 on the rod, by which the compression of the spring may be adjusted. The sleeve may be moved vertically by a hand wheel 27 threaded on the outside of the sleeve and normally resting on the top of the bracket 20, a pin 28 passing through slots in the rod and sleeve, serving to prevent rotation of these parts. Breakage of the valve 18 is prevented by this construction, on both the opening and closing movements. If downward movement of the gate is obstructed, the continued rotation of the hand wheel 27 will merely lift the wheel from the bracket 20, leaving the gate free to descend by gravity when the obstruction yields or is removed. If an attempt is made to lift the gate while it is held in the inlet 13, by hard or viscous glass, the spring 25 will be compressed, putting the gate under an upward tension sufficient to lift it as the glass yields or softens, but not a sufficient tension to injure the gate. This tension may be adjusted by the nut 26.

The front of the basin is formed by a spout block 29 having its bottom wall provided with a cylindrical chamber or well 30 through which the glass is discharged. At the lower end of the well is an annular outlet ring 31 which, for the purpose of conserving the heat of the glass, is provided with a jacket of insulating material 32 enclosed by a casing 33.

These outlet rings are made in various sizes, for producing mold charges of different sizes and proportions, and are removable and interchangeable.

The joint between the bottom of the spout block 29 and the outlet ring 31 is made glass-tight by the use of a luting or packing 36.

This packing is preferably made of clay, in a plastic condition, pressed into position when the outlet ring is applied. The spout block is generally hot during this operation and this causes the plastic clay to set quickly as soon as it comes into contact with the block. This makes it necessary to position the outlet ring quickly in its final position after the clay packing has once touched the spout block. It is also highly desirable that replaced or successive outlet rings shall occupy an exact position, both laterally and vertically.

One object of the invention is, therefore, to provide means for rapidly, accurately and forcibly positioning the outlet ring below the spout block and for holding it firmly in this position. The outlet ring 31 is placed in its seat in a swinging carrier 37, and a lever 38 is provided to move the carrier and to place the outlet ring quickly and forcibly in position. The lever is pivoted on a stud 39 and its short arm engages the bottom of a flange 40 (Figs. 3 and 4) depending from the rear of the carrier. The carrier is pivoted on a stud 41 mounted in ears 42 on the spout block casing 43, so as to swing up into proper relation to the well 30 and into the path of movement of the short arm of the lever 38. The lever is turned by hand or foot pressure to force the outlet ring with the plastic clay on top, toward the well until lugs 44 prevent further movement, thus positively positioning the ring. The lever is then secured in position by a screw 45 loosely mounted in a lug 46 and engaging a threaded hole in the lever. In the illustrated embodiment of the invention, the outlet ring 31 is applied to the carrier as a unit, including the casing 33 and insulation 32, but the casing 33 may be omitted and the ring 31 may be constructed to be supported directly by the carrier 37 if desired.

The gate block 14 and the spout block 29 are of the customary refractory material and are made in independent, separable sections, for convenient attachment and removal to and from each other and to the end of the forehearth 11. They are supported by the iron casing and are luted together by fire clay or other suitable cement at the joints 21 and 22 respectively. This enables these sections to be removed without injury, new luting being applied when the joints are to be remade. The sections may be clamped together securely at the joints by means of suitable bolts or rods 34 extending from the spout block casing 43 back to any convenient point of attaching on the furnace structure.

A vertically movable plunger 49 is reciprocated in the well 30 to periodically accelerate and retard the discharge of glass through the outlet ring. This acceleration and retardation of discharge is an important factor in determining the shape of the suspended mold charge, other factors being the relative proportions and arrangement of the plunger, the well, the outlet therefrom, and the plunger movement. The relation between the diameter of the plunger and the diameter of the well is such that the downward movement of the plunger acts to cause an acceleration of discharge while the upward movement of the plunger causes a retardation of discharge, from the outlet. This retardation may be made sufficient to hold the glass in the outlet nearly motionless for a short time, or it may be made to cause a retraction of the glass in and just below the outlet, the effects produced being dependent on the relative size of the parts and the speed of the upward movement of the plunger. The plunger acts as a piston in a cylinder, the glass between the plunger and the well forming a viscous packing for the piston. In order that the piston effect of the plunger may be available at all times, the lower end of the plunger preferably remains within the well 30 during its reciprocations, and the extent of its minimum length of projection into the well may be varied so as to vary the length of the flow resisting passage into the well around the plunger and thus contribute to further regulation of the weight of the resultant mold charges. Keeping the end of the plunger constantly in the well also enables the plunger to maintain constant control over the discharge and shaping of the mold charge. The plunger acting in combination with the well and other elements of the apparatus thus constitute effective means for producing successive, suspended masses of glass beneath the outlet and for controlling the shape of such masses when given the proper character of motion. An apparatus operating in the above described manner is shown and described in my copending application Serial No. 543,571, filed March 14, 1922.

In the illustrated embodiment of the invention the plunger 49 is removably secured in an adjustable bracket 50 (Fig. 1) in alignment with the well 30. The bracket is fixed to the upper ends of two guide rods 51, slidable in bearings 52 formed on the spout block casing 43. The vertical movements of the plunger are determined by a cam 53 which lifts the plunger through connections comprising a cam roll 54, bell crank 55 and a link 57 connected with the bracket 50. The cam raises and lowers the plunger once for every mold charge fed and for every operation of the shears, the weight of the parts being sufficient to cause the cam roll to follow the cam on the down-stroke of the plunger. The cam is usually so shaped as to begin to raise the plunger just prior to or during the severing operation to assist the shears in shaping the stub, continuing this rise after the severing is completed to further retard the discharge and, if desired, to retract the stub into the outlet. Then the cam allows the plunger to pause at its highest position, and at the proper time lowers it again at the speed required for shaping the gather during the discharge, accelerating the discharge when required to counteract the tendency of the upper portion of the mold charge to attenuate. The plunger may then be allowed to remain in its lower position for a short time prior to severing, and the cycle of operation is completed. The contour of the cam may be varied from the contour shown in Fig. 1, to produce mold charges of the various shapes desired for glass articles of different shapes.

A better control is maintained over the shape of the mold charge if the plunger is operated as near the bottom of the well as is possible without throttling the outlet. It is also desirable to vary the length of the plunger stroke in order to produce various accelerating or retarding effects at the outlet to assist in controlling the shape of the mold charge. Therefore, the mechanism is arranged for varying the amplitude of reciprocation of the plunger 49 while keeping its lowest position constant. For this purpose the link 57 is provided with a pivot stud 61 which can be moved in a slot 60 formed in the lever 56, toward and from the pivot 62 of the lever, thereby increasing or decreasing the effective length of the lever 56 and, therefore, the reciprocation of the plunger 49. In order that this adjustment may not cause variation in the low position of the plunger, the slot 60 is arc shaped, having its center at the pivotal connection 63 between the lower end of the link 57 and the bracket 50, when the plunger is in its low position. Thus when the plunger is down, the link 57 may be adjusted in the slot 60 of an arm 56 without changing the position of the plunger, but when the lever 56 is lifted, the high position of the plunger will be varied in accordance with the position of the pivot 61 in the lever. The pivot stud 61 is in a form which may be clamped to secure the pivot in fixed position in the slot 60 without interfering with its pivotal action.

Shears are provided for severing the suspended mold charges from the glass in the outlet, a shear blade being indicated at 68 (Figs. 1 and 3). The severing mechanism forms no part of the present invention, and any of the well-known devices for this purpose may be employed. The shaft 69 which carries the cam 53, or a shaft geared thereto, may be provided with suitable cam mechanism to cause the shear blades 68 to reciprocate and sever a mold charge from a suspended gather of glass in proper time relation to the plunger operations.

For the purpose of conserving the heat of the glass in the pool 12, the front end of the basin or pool is enclosed by a cover 72 (Figs. 1 and 3). The cover is provided with a heat insulating jacket 73 of suitable insulating material, such, for example, as powdered kieselguhr, retained in position by a casing 74 and a plate 75. The other portions of the pool are enclosed by covers 76 and 77, which may be provided with an insulating jacket similar to that provided for the cover 72. Suitable apertures are provided through the covers for the passage of the plunger 49 and the gate 18, as shown in Fig. 3, and for a suitable number of gas burners 78 disposed so as to heat the glass in the pool.

The spout block 29 is also provided with an insulating jacket 79 enclosed by the casing 43, the latter being provided with an inwardly extending flange 43a, Fig. 3, at its upper edge for preventing upward displacement of insulation surrounding the spout block 29. This casing is preferably provided with a depending apron 80, which retains insulating material in place on the front of the block 14. The lower portion of the block 14 is provided with a chamber 81 for holding insulation to minimize the loss of heat from the glass in the supply passage 15.

Another important feature of this invention relates to the construction by which a comparatively deep well from which the heat loss is reduced to a minimum, is provided to receive the lower end of the plunger. The well projects both above and below the floor of the basin, the upper extension being formed by a curb 82 projecting into the glass in the pool, and the lower extension formed by the depending cylindrical wall 83 of the well. The upper part of the well formed by the curb 82, is surrounded by the molten glass, and therefore has practically no heat loss.

In order to reduce to a minimum the heat loss from the depending refractory wall 83, this wall which is not a highly efficient heat insulator, is made as thin as possible and is surrounded by the insulating jacket 79 preferably of powdered kieselguhr. The wall 83 is preferably strengthened by longitudinal ribs 84 connecting the bottom of the basin with a flange 85 against which the outlet ring 31 is secured (Fig. 3). This flange 85 serves to locate and support the spout block 29 in a recessed seat in the metal casing or holder 43, and because of the shape and thinness of the flange, very little heat flows from it to the holder 43 or from exposed portions. This ribbed and flanged construction forms a series of pockets around the depending part of the well, for holding insulating material and provides a strong cylinder of high heat insulating efficiency, for the operation of the plunger.

Fig. 7 illustrates somewhat diagrammatically a modification of the invention in which the supply of glass to the basin flows downwardly instead of upwardly, as in the preceding figures. The basin or spout block 87 and the gate block 88 are, or may be, made in separable sections attached to the forehearth 89, and supported, encased, and provided with insulating material, outlet rings, and other adjuncts substantially as shown in Figs. 2 and 3; also the plunger 90, regulating gate 91 and other adjuncts may be employed and operated as shown and described in connection with the preceding figures.

The operation of the apparatus has been described in some detail in connection with the description of the parts. In brief, after the plunger 49 has been put into operation, the level of the glass in the pool 12 is regulated by adjustment of the gate 18, until mold charges of the desired weight are obtained. The stroke of the plunger may be regulated by adjusting the pivot 61 in the slot 60 to secure the desired effect of the stroke on the shape of the mold charges within the limits determined by any contour of the cam 53. Various other adjustments which are no part of the present invention may also be provided to assist in controlling the shape of the mold charges. It is to be understood that these adjustments in size and weight are primarily operating adjustments to correct changes which occur during the manufacture of one line of ware and that when the apparatus is to be re-set for ware of different character, it may be necessary to make certain changes, such as the substitution of a different plunger operating cam, in order to produce desired changes in size or shape of the ware.

The up-stroke of the plunger periodically retards the discharge of glass and may be made to retract the stub from the shear blades if desired. On the down-stroke the discharge of glass is accelerated and the glass is discharged at such a time and rate as to produce suspended mold charges of the desired size and shape.

While the several features of the invention have been illustrated and described as combined in an organized glass feeding machine, it is to be understood that such conjoint use is not essential to the invention, and that various modifications of these features, either individually or collectively, may be made without departing from the spirit of the invention as defined by the appended claims.

I claim:—

1. In apparatus for feeding molten glass, the combination with a glass melting container, of a basin for the glass provided with a discharge outlet, a gate block having a vertical flow passage therein, a flow passage having walls diverging from the vertical passage to the container, a flow passage having walls diverging from the vertical passage to the basin, and an adjustable gate member for controlling the flow of glass through the vertical passage.

2. In apparatus for separating molten glass into mold charges, the combination with a discharge basin for the glass having a well in its bottom terminating in a discharge outlet, of a supply passage entering the bottom portion of the discharge basin at a level not materially above the top of said well to supply glass thereto, stationary means adjustable to regulate the effective size of the supply passage to control the depth of glass in the basin and thereby regulate the weight of the mold charges, a vertically movable plunger projecting into the well for controlling the shape of the mold charges, means for moving said plunger periodically in a cyclic order to form successive suspended masses of glass of definite shape beneath the outlet, and shears operating periodically beneath the outlet to sever a mold charge from each suspended mass.

3. Apparatus for separating molten glass into mold charges, comprising a basin provided with a discharge opening in its bottom, a curb surrounding said opening on the inside of the basin, a wall surrounding said opening on the outside of the basin, said curb and wall forming a well terminating in a discharge outlet, a plunger arranged for vertical reciprocation in the well below the inside of the basin to control the discharge of glass from the outlet, and means for reciprocating the plunger periodically to control the shape of the mold charges.

4. In apparatus for feeding molten glass, the combination with a melting tank forehearth having a flow channel therein, of a discharge basin connected to the said channel by a vertical flow passage communicating with a horizontal passage in said channel and with a horizontal passage in said basin, and an adjustable valve for controlling the flow of glass through the said vertical passage.

5. In apparatus for feeding molten glass, the combination with a glass melting container of a basin for the glass provided with a discharge outlet, a gate block having a vertical flow passage therein, a flow passage having walls diverging from the vertical passage to the container, and a flow passage having walls diverging from the vertical passage to the basin.

6. In apparatus for feeding molten glass, the combination with a basin for the glass provided with a discharge outlet, of a vertical supply passage for supplying glass to the basin and entering the basin below the top of the outlet, and a valve for controlling the effective flow area of said passage to regulate the amount of glass supplied to the discharge outlet.

7. In apparatus for feeding molten glass, the combination with a container for the glass provided with a discharge outlet, of a vertical supply passage for conducting glass from a glass furnace to the container, and entering the container at approximately the level of the top of the outlet, and a stationary but vertically adjustable valve to regulate the effective area of said vertical passage for controlling the upward flow of glass through said passage.

8. In apparatus for feeding molten glass, the combination with a glass melting furnace, of a basin for the glass provided with a discharge outlet, a gate block defining a part of said basin, said block being provided with a horizontal passage communicating with the furnace and with a vertical flow passage connecting said horizontal passage and said basin, and lutings of fire clay in the joints between the gate block, the basin and the furnace, whereby the gate block may be separated from the furnace and the basin.

9. Apparatus for feeding molten glass, comprising a basin for the glass having a downwardly projecting discharge nozzle provided with strengthening ribs at the lower portion thereof, an annular supporting member engaging the lower portion of said nozzle and thereby supporting the basin, and heat insulating material surrounding said nozzle and located between said basin and the support.

10. Apparatus for feeding molten glass, comprising a basin for the glass having a downwardly projecting nozzle provided with an annular rim portion at the bottom thereof, an annular supporting member engaging the lower rim portion of said nozzle, and thereby supporting the basin and heat insulating material surrounding said nozzle and located between said basin and the support.

11. Apparatus for feeding molten glass, comprising a basin for the glass having a downwardly projecting discharge nozzle provided with an outwardly projecting flange at its lower end, and an annual metallic support engaging the said flange and thereby supporting the basin.

12. Apparatus for feeding molten glass, comprising a basin for the glass having a downwardly projecting discharge nozzle, said nozzle being provided at its lower end with an outwardly projecting flange, a casing engaging the said flange and spaced from the basin, and insulating material in the space between the casing and the basin.

13. Apparatus for feeding molten glass, comprising a basin for the glass having a downwardly projecting discharge nozzle, a flange at the lower part of the nozzle forming a channel between the flange and the bottom of the basin, a casing spaced from the bottom of the basin and engaging the flange, and insulating material in the said channel.

14. Apparatus for feeding mold charges of molten glass from a forehearth connected to a glass melting tank, comprising a discharge basin formed in the forehearth, said basin having a submerged discharge outlet and a submerged inlet in the bottom thereof, a reciprocable plunger for controlling the discharge of glass from the outlet, a stationary but adjustable flow controlling implement adjustably mounted above the inlet to regulate the level of the glass in the container, and means including a spring for adjustably supporting the implement relative to the inlet and yieldably moving said implement toward and away from the inlet.

15. Apparatus for discharging molten glass from an outlet in a container, having in combination an outlet ring, a carrier therefor guided to move toward and from the outlet, and a lever mounted to swing into the path of movement of the carrier and adapted to move the carrier to position the outlet ring.

16. Apparatus for discharging molten glass from an outlet in a container, having in combination an outlet ring, a pivotally mounted carrier therefor, a lever having an end adapted to swing beneath the carrier as it approaches final position, and means for securing the lever in position to hold the carrier in operative relation to the outlet.

17. Apparatus for controlling the movement of molten glass, comprising a horizontal valve seat, a valve member adjustably positioned above said valve seat, and means for supporting and adjusting said valve member comprising a stationary support, a rod from which said valve member is suspended, a sleeve loosely surrounding said rod and loosely extending through said support, a hand nut threaded on said sleeve above said support, a nut threaded upon said rod above said hand nut, a spring disposed between said last-mentioned nut and the upper end of said sleeve, and means for preventing rotation of said rod and said sleeve.

18. The combination of a container for molten glass, an annular member projecting upward from the floor of the container and providing an open bottomed well through which glass is discharged from the container, means for maintaining a supply of molten glass within the container with the level of the glass above the upper surface of said member, a plunger projecting downward into the well, and means to periodically reciprocate the plunger up and down.

19. The combination of a furnace comprising a boot or extension into which glass flows from the furnace, said boot having an outlet opening in the bottom thereof, an annular member surrounding said outlet and projecting upward from the floor of the boot and providing a well into and through which the glass flows from the boot, said member having its upper edge below the level of the glass to permit the entrance of the glass to the well, said member preventing the entrance of glass to the well except over the top of said member, a regulating device projecting downward into the well, and means to periodically reciprocate said device.

20. The combination of a container for molten glass having an outlet opening in the bottom thereof, a regulator in the glass above the outlet, means to periodically reciprocate the regulator up and down, a wall surrounding and spaced from the regulator and extending upward from the floor of the receptacle and terminating below the surface of the glass to provide a well, said well being closed except at its top and bottom whereby the glass is caused to enter the well by flowing over the top of said wall.

21. The combination of a container for molten glass having an outlet opening in the bottom thereof, a regulating plunger in the glass above the outlet, a wall surrounding said outlet and extending upward above the floor of the container to form a cylindrical well into which said plunger projects, said well being closed except at its top and bottom whereby the glass is caused to enter the well by flowing over the top of said wall, said plunger comprising a substantially cylindrical body, the lower end of which is the full diameter of the plunger, and means to periodically reciprocate the plunger vertically.

Signed at Fairmont, West Virginia, this 15th day of March, 1922.

KARL E. PEILER.